US010645541B2

(12) United States Patent
Yang et al.

(10) Patent No.: US 10,645,541 B2
(45) Date of Patent: May 5, 2020

(54) METHOD AND SYSTEM TO EXTEND CONNECTION TIME OF A TALKGROUP CONVERSATION BASED ON HISTORICAL TALKGROUP STATISTICS

(71) Applicant: MOTOROLA SOLUTIONS, INC, Chicago, IL (US)

(72) Inventors: Yunhai Yang, Elgin, IL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/142,010

(22) Filed: Sep. 26, 2018

(65) Prior Publication Data

US 2020/0100069 A1 Mar. 26, 2020

(51) Int. Cl.
| | | |
|---|---|---|
| H04W 4/10 | (2009.01) | |
| H04L 12/26 | (2006.01) | |
| H04W 4/08 | (2009.01) | |
| H04W 76/38 | (2018.01) | |

(52) U.S. Cl.
CPC ............. *H04W 4/08* (2013.01); *H04W 76/38* (2018.02)

(58) Field of Classification Search
CPC ......... H04W 4/06; H04W 4/025; H04W 4/10; H04W 4/16; H04W 74/004; H04W 74/006; H04W 76/45; G06F 17/30; G06F 17/30542; B60R 1/06; B60R 1/0612
USPC ............... 455/518, 519, 517, 520, 512, 416; 370/312, 252, 254
See application file for complete search history.

(56) References Cited

U.S. PATENT DOCUMENTS

| | | | |
|---|---|---|---|
| 8,301,176 B1* | 10/2012 | Yellin | H04W 52/0229 |
| | | | 455/458 |
| 8,478,261 B2 | 7/2013 | Vempati et al. | |
| 9,363,772 B2 | 6/2016 | Burks | |
| 2003/0017836 A1* | 1/2003 | Vishwanathan | H04L 29/06 |
| | | | 455/517 |
| 2005/0064888 A1* | 3/2005 | Schaefer | H04W 4/10 |
| | | | 455/509 |
| 2006/0003784 A1* | 1/2006 | Chion | H04W 4/10 |
| | | | 455/518 |
| 2006/0250995 A1* | 11/2006 | Lee | H04B 1/44 |
| | | | 370/276 |
| 2010/0281178 A1* | 11/2010 | Sullivan | H04N 7/24 |
| | | | 709/231 |

(Continued)

FOREIGN PATENT DOCUMENTS

GB 2420252 A 11/2004

*Primary Examiner* — Tan H Trinh

(57) ABSTRACT

A method for extending the connection time of talkgroup radios in a talkgroup conversation based on historical talkgroup statistics is provided. A talkgroup conversation request intended for a talkgroup is received from a first mobile unit. A group call grant message is sent to radios that are members of the talkgroup. The group call grant message initiates the talkgroup conversation with a first talkgroup call and includes an extended connection time value. Once it is determined that the first talkgroup call has ended, all radios that are members of the talkgroup are kept in a connected state. An extended connection timer utilizing the extended connection time value is started. Upon expiration of the extended connection timer, all radios that are members of the talkgroup are set to an idle state.

8 Claims, 2 Drawing Sheets

(56) References Cited

U.S. PATENT DOCUMENTS

| | | | |
|---|---|---|---|
| 2012/0163204 A1* | 6/2012 | Oprescu-Surcobe | H04W 72/005 370/252 |
| 2014/0031019 A1* | 1/2014 | Qi | H04W 4/00 455/416 |
| 2014/0066118 A1* | 3/2014 | Pai | H04W 4/10 455/518 |
| 2015/0310730 A1* | 10/2015 | Miller | H04W 4/90 340/539.13 |
| 2018/0054799 A1 | 2/2018 | Starsinic et al. | |
| 2018/0184257 A1* | 6/2018 | Proctor | H04W 4/08 |
| 2019/0079463 A1* | 3/2019 | Hirota | G04G 19/06 |
| 2019/0141552 A1* | 5/2019 | Chen | H04W 24/08 |

* cited by examiner

METHOD AND SYSTEM TO EXTEND CONNECTION TIME OF A TALKGROUP CONVERSATION BASED ON HISTORICAL TALKGROUP STATISTICS

BACKGROUND OF THE INVENTION

In Land Mobile Radio (LMR) communication systems, a mobile device monitors a control channel, for example for group call activity, such as talkgroup calls. For radios that have fallen back to Long Term Evolution (LTE) systems, a mobile radio goes to idle state after ten seconds of inactivity.

If a new talkgroup call is started, an idle mobile radio that is on the LTE system and in the talkgroup needs to be paged and switched from idle mode to connected mode. In current systems, the paging cycle is 1.28 seconds. If the initial page fails, a nationwide page is required to attempt to locate the mobile radio. This adds additional time, perhaps up to several seconds, until the radio is in connected mode and part of the call. To avoid audio truncation of the start of the audio of the talkgroup call, the audio is typically not sent until all talkgroup radios are in connected mode. Such a delay is unacceptable for missions critical use cases.

Therefore, a need exists for a method and system to begin talkgroup calls immediately without having audio truncation. Further, a need exists to start talkgroup calls immediately with audio truncation and without draining the batteries of mobile devices that are part of the talkgroup.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
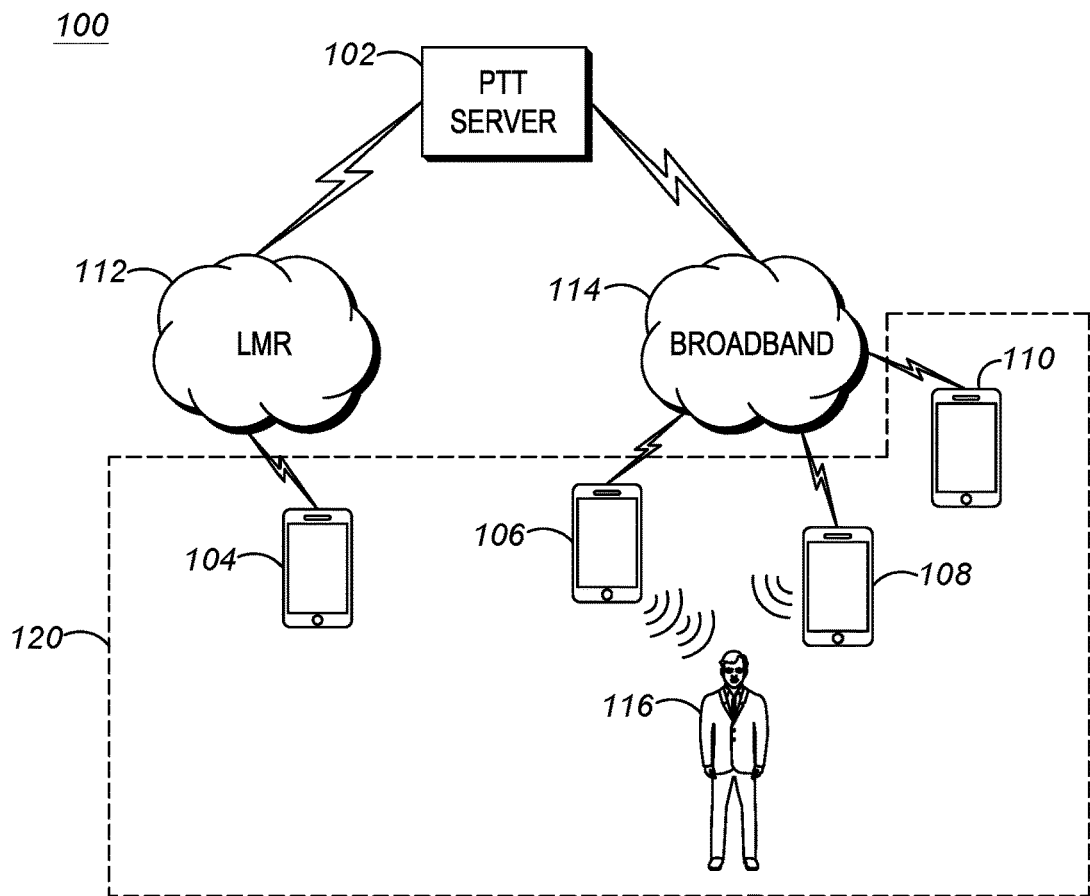
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment provides mission critical talkgroup service while eliminating truncation and delay when some of the member talkgroup radios are on a Broadband LTE (Long Term Evolution) system.

FIG. 1 depicts a system diagram of a communication system 100 in accordance with an exemplary embodiment of the present invention. Communication system 100 preferably includes a PTT server 102, a land mobile radio (LMR) network 112, a broadband network 114, and communication devices 104, 106, 108, and 110. The communication devices 104, 108, 108, and 110 are sometimes referred to as subscriber units. A user 116 of communication device 108 may carry the communication device 108, for example, on a belt or within a pants pocket. The user 116 is also in close proximity to communication device 106 (for example, within about twenty (20) feet or less). Communication devices 104, 106, 108, and 110 additionally form talkgroup 120. In this embodiment, communication device 104 is connected to LMR network 112, while communication devices 106, 108 and 110 are connected to broadband network 114.

Figure 2:
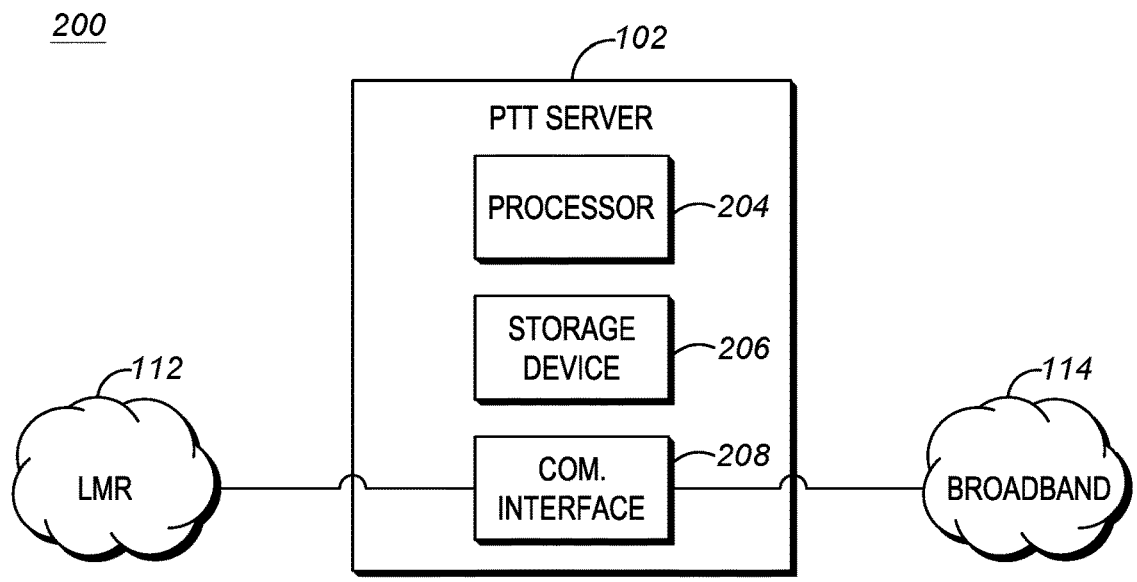
FIG. 2 depicts a PTT Server in accordance with an exemplary embodiment of the present invention.

PTT server 102, described more particularly below with respect to FIG. 2, is also communicatively coupled to LMR Network 112 and Broadband Network 114. User 116 may be in close proximity to multiple communication devices, such as communication device 106 and 108, and therefore may hear audio output from both at the same time. Because of this, communication devices 106 and 108 may cause an echo if their respective audio transmissions are unsynchronized, and therefore communication system 100 is set up to synchronize audio transmissions between devices with different speeds and different networks to reduce echoes.

FIG. 1 illustrates a graphical representation of an example talkgroup 120 that includes communication devices 106, 108, and 110. Although each communication device 106, 108, and 110 is shown affiliated with talkgroup 120, devices 106, 108, and 110 may be associated with one or more other talkgroups. In addition, throughout the following description, reference is made to talkgroup 120 and communication devices 106, 108, and 110 to provide examples of the methods and systems being explained. Talkgroup 120 is merely exemplary and has been simplified for the sake of explanation. In some embodiments, communication system 100 includes more or fewer communication devices and more or fewer talkgroups. In some embodiments, the talkgroups have more or fewer affiliated communication devices. In some embodiments, the talkgroups do not have the same number of affiliated communication devices. While FIG. 1 illustrates four communication devices 104, 106, 108, and 110 for clarity purposes, it should be understood that the methods herein can be used with more or fewer communication devices.

FIG. 2 schematically illustrates PTT server 102 in more detail. In the example provided, PTT server 102 includes an electronic processor 204, a storage device 206, and a communication interface 208. Electronic processor 204, storage device 206, and communication interface 208 communicate over one or more communication lines or buses. Wireless connections or a combination of wired and wireless connections are also possible.

Electronic processor 204 may include a microprocessor, application-specific integrated circuit (ASIC), field-programmable gate array, or another suitable electronic device. Electronic processor 204 obtains and provides information (for example, from storage device 206 and/or communication interface 208), and processes the information by executing one or more software instructions or modules, capable of being stored, for example, in a random access memory ("RAM") area of storage device 206 or a read only memory ("ROM") of storage device 206 or another non-transitory computer readable medium (not shown). The software can include firmware, one or more applications, program data, filters, rules, one or more program modules, and other executable instructions. Electronic processor 204 is configured to retrieve from storage device 206 and execute, among other things, software related to the control processes and methods described herein.

Storage device 206 can include one or more non-transitory computer-readable media, and may include a program storage area and a data storage area. The program storage area and the data storage area can include combinations of different types of memory, as described herein. In the embodiment illustrated, storage device 206 stores, among other things, instructions for the processor to carry out the methods of FIGS. 3 and 4.

Communication interface 208 may include a transceiver (for example, a Wi-Fi or Ethernet transceiver) for communicating over one or more wired or wireless communication networks (for example, the land mobile radio (LMR) network 112 or the broadband network 114) or connections.

In some embodiments, PTT server 102 performs machine learning functions, as described above. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

Figure 3:
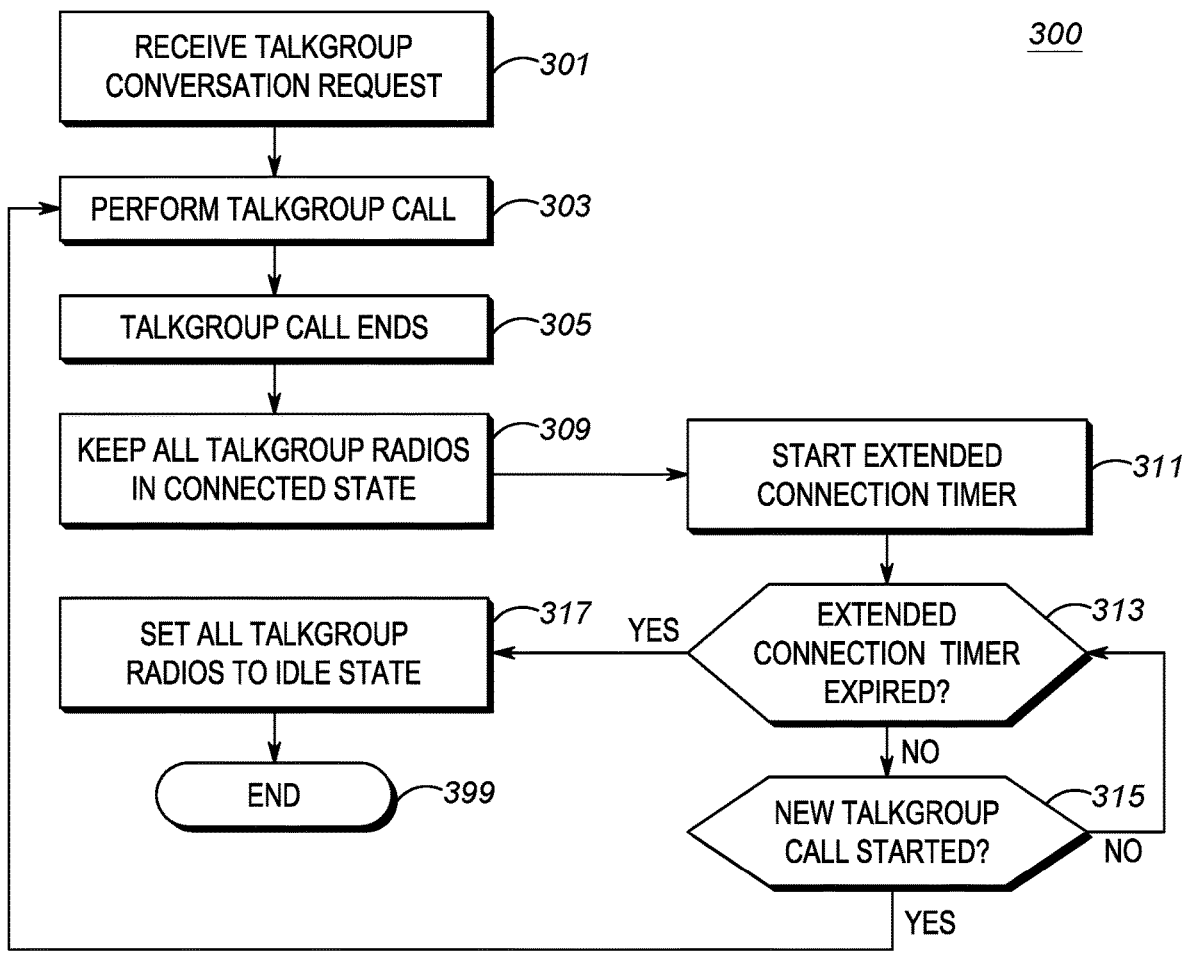
FIG. 3 depicts a flowchart in accordance with an exemplary embodiment of the present invention.

FIG. 3 depicts a flowchart 300 in accordance with an exemplary embodiment of the present invention. A typical incident involves a burst of radio traffic that could include users on LMR sites and LTE sites utilizing a Backup PTT solution.

PTT Server 102 receives (301) a talkgroup conversation request. The communication system determines the talkgroup associated with the talkgroup conversation request, and transmits a group call grant message to all members of the talkgroup that are currently registered in Broadband Network 114. In accordance with an exemplary embodiment, an extended connection time value is included in the group call grant message.

As used herein, a talkgroup conversation means a series of related talkgroup calls. For example, a member of the talkgroup may initiate a talkgroup conversation by pushing a PTT button on a radio. This user will speak into a microphone on the land mobile radio, and this audio is transmitted to other members of the talkgroup. Upon finishing the audio message, the user releases the PTT button and this talkgroup call is completed. However, the talkgroup conversation remains open in order to give other members, or the initiating user, the opportunity to transmit a talkgroup call within the current conversation. Talkgroup conversations generally include back and forth calls, often followed by an officer taking action. These talkgroup conversations need to occur in a mission-critical fashion with minimal audio truncation or delay.

For the first talkgroup call in a talkgroup conversation, audio transmission will be held off in order to give enough time for participating broadband radios in the talkgroup to wake up and indicate participation in the talkgroup call. This avoids audio truncation of the beginning of the audio for the new talkgroup call. In accordance with an exemplary embodiment, audio holdoff will not be performed for any subsequent calls within this talkgroup conversation because the radios in the talkgroup will remain in connected mode rather than switch to idle mode after the first call in the talkgroup conversation ends, which is what happens in current communication systems.

PTT Server 102 transmits (303) the talkgroup call, which in an exemplary embodiment is the first talkgroup call in this talkgroup conversation.

At some point, the current caller will release the PTT button and thereby stop sending voice to other members of the talkgroup, at which point this portion of the talkgroup conversation, this talkgroup call, ends (305). In current communication systems, all radios in the talkgroup call would move from connected mode to idle mode. In accordance with an exemplary embodiment, this does not necessarily happen.

PTT Server 102 assumes (309) all radios in the current talkgroup are in a connected state. By assuming that the talkgroup radios are in a connected state, talkgroup call delay is eliminated due to the talkgroup radios not having to go through the sleep, page, and wake up cycles. In addition, since the talkgroup radios remain in the connected state, audio truncation does not happen. Further, any new transmission, such as a new talkgroup call, can be started immediately without the need for paging members of the talkgroup, and therefore there are no audio truncation issues.

The system starts (311) an extended connection timer. For the first call in this talkgroup conversation, the extended connection time is set to the value included in the group call grant message. For future talkgroup calls within this talkgroup conversation, the extended connection time can be different from the extended connection time included in the group call grant message. In a first exemplary embodiment, the extended connection time can be adjusted to subtract the elapsed time in the current talkgroup conversation from the extended connection time included in the group call grant message. In this manner, the timer will expire around the original time set when the talkgroup conversation is started and not be continuously reset with each talkgroup call. In a second exemplary embodiment, the extended connection time can be modified as new data used to calculate the extended connection time is received. For example, talkgroup members can join or leave the conversation, priorities of users can change, roles of talkgroup users can change, to name a few.

PTT Server 102 determines (313) if the extended connection timer has expired. If the extended connection timer has expired, PTT Server 102 assumes that all radios in the talkgroup that are connected to Broadband Network 114 have been set to an idle state. Having the talkgroup radios in idle state extends battery life for the talkgroup radios. The process then ends (399).

If the system determines that the extended connection timer has not expired as determined at step 313, the system determines (315) if a new talkgroup call has been started. If the system determines that a new talkgroup call has started, which in this embodiment means that a call that is a part of a talkgroup conversation has started, the process returns to step 303 to process the talkgroup call at each of the talkgroup radios. Because all talkgroup radios are in the connected state, the talkgroup call can start immediately without waiting for radios to be paged and join the call ad without having to worry about audio truncation.

If the system determines at step 315 that a new talkgroup call has not started, the system returns to step 313 determine if the extended connection timer has expired.

Figure 4:
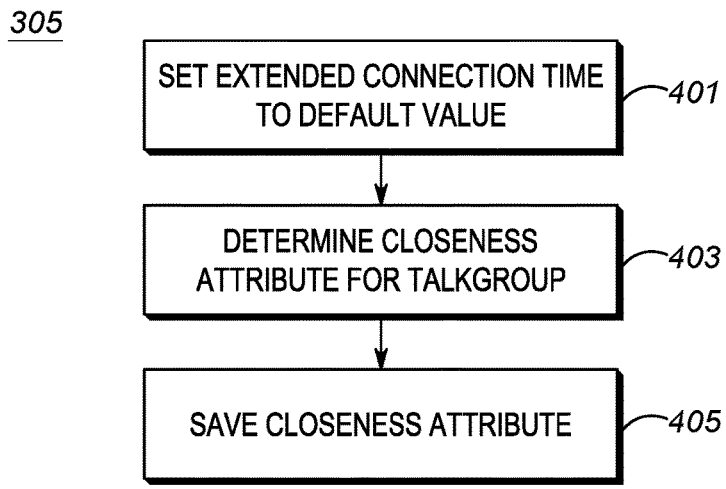
FIG. 4 depicts a flowchart in accordance with an exemplary embodiment of the present invention.

FIG. 4 depicts a flowchart 305 in accordance with an exemplary embodiment of the present invention. Flowchart 305 depicts an exemplary embodiment of a method for calculating an extended connection time utilizing a closeness attribute for the talkgroup.

PTT Server 102 sets (401) the extended connection time to a default value. In accordance with an exemplary embodiment, if PTT Server 102 determines that a talkgroup's current traffic pattern matches historical data that indicates that the talkgroup conversation will last a particular length of time, the radios in the talkgroup will stay connected for approximately that length to eliminate audio truncation on talkgroup calls within a talkgroup conversation. Once this timer expires, the radios in the talkgroup then go into Idle mode to maintain battery life.

PTT Server 102 determines (403) a closeness attribute for this talkgroup. The Closeness Attribute represents the closeness of talkgroup calls within a cluster, for example how long an overall talkgroup conversation lasts and the probability that another call within the talkgroup conversation will start prior to the end of the extended period of time. The Closeness Attribute is preferably used as an extended connection time at the end of a talkgroup call to keep all member talkgroup radios in the connected state for an extended period of time. A new call arrival within a conversation is highly probable to happen within the extended connection time, the time in which all the member talkgroup radios are still in their connected state. Each distinct talkgroup will have a closeness attribute associated with that particular talkgroup.

In accordance with an exemplary embodiment, the traffic pattern of the talkgroup is continuously analyzed and used to update the closeness attribute. This in turn helps estimate how long a particular talkgroup conversation will last and what period of time after a call end expects relatively high probability of a call arrival. PTT Server 102 uses statistically-learned group behavior to update the closeness attribute. Further, this can also help predict when audio will be present on the talkgroup. This helps minimize audio truncation, speeds up the start of talkgroup calls, and helps radios in the talkgroup conserve battery power by not remaining in the connected state for more time than is necessary.

The traffic pattern is preferably impacted by various factors. For example, the traffic pattern can be impacted by the number of talkgroup members, the user role in the call, or the incident type. In addition, the closeness attribute can change over time, for example as different users join the talkgroup, the number of users in the talkgroup, and the incident types involved in the talkgroup call. In an exemplary embodiment, the closeness attribute is continuously learned, categorized, and adjusted by PTT Server 102.

The communication system/PTT Server saves (405) the closeness attribute and the extended connection time. The extended connection time value is included in a group call grant message that starts a new talkgroup conversation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving a talkgroup conversation request intended for a talkgroup from a first mobile unit;
   sending a group call grant message to radios that are members of the talkgroup, the group call grant message initiating the talkgroup conversation with a first talkgroup call and including an extended connection time value;
   determining that the first talkgroup call has ended;
   keeping all radios that are members of the talkgroup in a connected state;
   starting an extended connection timer utilizing an adjusted extended connection time value; and
   upon expiration of the extended connection timer, each of the radios that are members of the talkgroup transition to an idle state.

2. The method of claim 1, the method further comprising the step of starting a second talkgroup call in the talkgroup conversation without paging the radios that are members of the talkgroup.

3. The method of claim 2, the method further comprising the step of cancelling the extended connection timer.

4. The method of claim 1, wherein the adjusted extended connection time value comprises the extended connection time value minus an elapsed time of the talkgroup conversation.

5. The method of claim 1, wherein the adjusted extended connection time value comprises the extended connection time value adjusted by at least one of additional radios joining the talkgroup, radios leaving the talkgroup, a priority of one of the radios that are members of the talkgroup, and a changed role of one of the radios that are members of the talkgroup.

6. The method of claim 1, the method further comprising the step of starting a second talkgroup call in the talkgroup conversation without performing audio holdoff.

7. The method of claim 1, the method further comprising the step of starting a second talkgroup call in the talkgroup conversation, wherein the second talkgroup call is started immediately.

8. A Push To Talk (PTT) Server comprising:
   a communication interface that performs:
      receiving a talkgroup conversation request intended for a talkgroup from a first mobile unit; and
      sending a group call grant message to radios that are members of the talkgroup, the group call grant message initiating the talkgroup conversation with a first talkgroup call and including an extended connection time value; and
   a processor that performs:
      determining that the first talkgroup call has ended;
      keeping all radios that are members of the talkgroup in a connected state;
      starting an extended connection timer utilizing an adjusted extended connection time value; and
      upon expiration of the extended connection timer, each of the radios that are members of the talkgroup transition to an idle state.

* * * * *